United States Patent [19]

Shimizu et al.

[11] Patent Number: 5,920,382
[45] Date of Patent: Jul. 6, 1999

[54] DISTANCE-MEASURING APPARATUS

[75] Inventors: Hideo Shimizu; Takehide Hirabayashi, both of Tokyo; Akio Izumi, Nagano, all of Japan

[73] Assignee: Fuji Electric Co., Ltd., Kawasaki, Japan

[21] Appl. No.: 08/896,272

[22] Filed: Jul. 15, 1997

[30] Foreign Application Priority Data

Jul. 17, 1996 [JP] Japan ..................................... 8-186496
Jul. 17, 1996 [JP] Japan ..................................... 8-186497
Apr. 16, 1997 [JP] Japan ..................................... 9-099361

[51] Int. Cl.$^6$ ..................................................... G01C 3/00
[52] U.S. Cl. ..................... 356/3.14; 250/201.6; 180/167; 340/903; 396/121; 396/128
[58] Field of Search ................................ 356/3.14, 3.15; 250/201.6; 180/167; 340/903; 396/121, 128

[56] References Cited

U.S. PATENT DOCUMENTS 4,766,421 8/1988 Beggs et al. ............................. 340/904
5,166,681 11/1992 Bottesch et al. ........................ 340/933

Primary Examiner—Stephen C. Buczinski
Attorney, Agent, or Firm—Kanesaka & Takeuchi

[57] ABSTRACT

A distance-measuring apparatus includes light-sensitive devices formed of optical sensor arrays disposed on image-forming surfaces of right and left image-forming lenses, respectively. The apparatus uses image data from the optical sensor arrays of the light-sensitive devices to determine the distance from an object such as a vehicle in front of the apparatus via a distance detection circuit and capable of detecting condensation or a foreign particle obscuring a cover glass or defective pixels in the optical sensor arrays. In a defective condition, a defective visibility sensor emits an alarm signal to alert the operator.

9 Claims, 15 Drawing Sheets

Fig. 2(A)
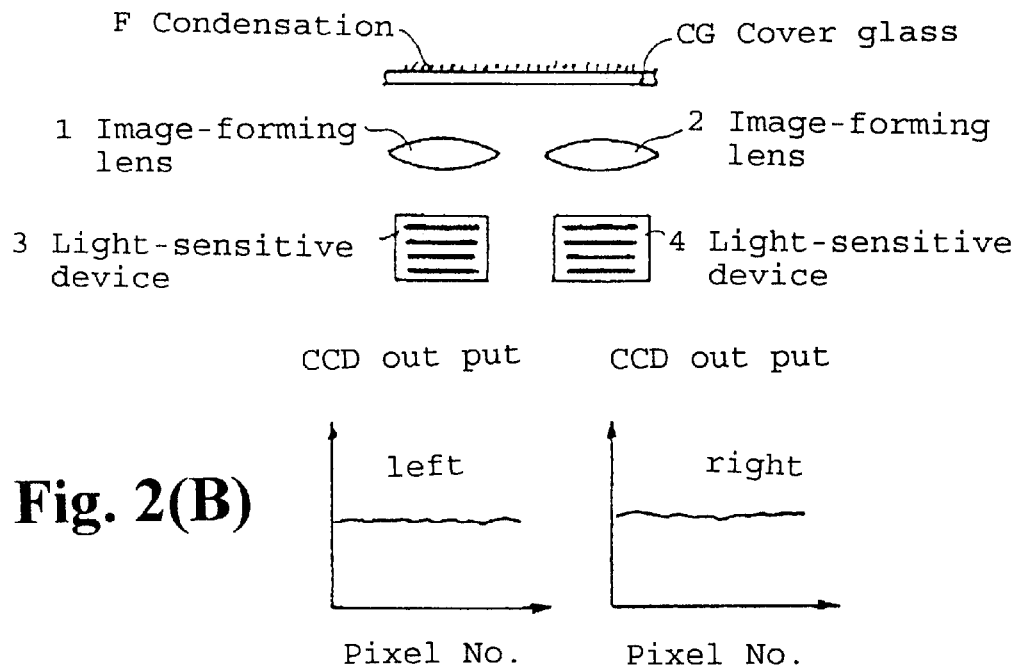
Fig. 2(B)
Fig. 3(A)
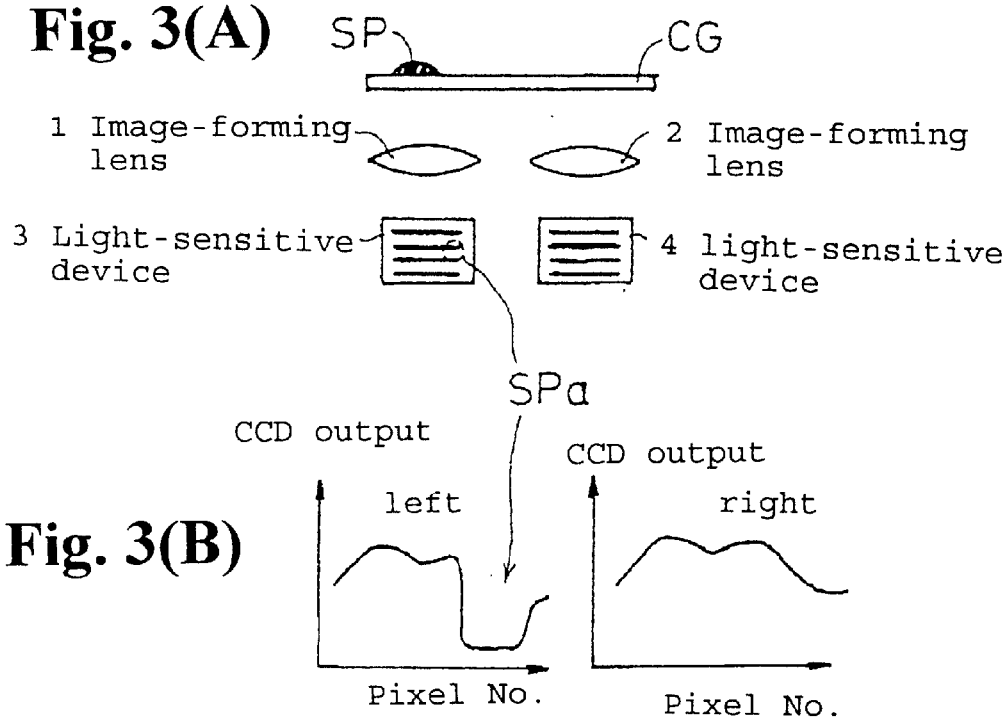
Fig. 3(B)

Fig. 7

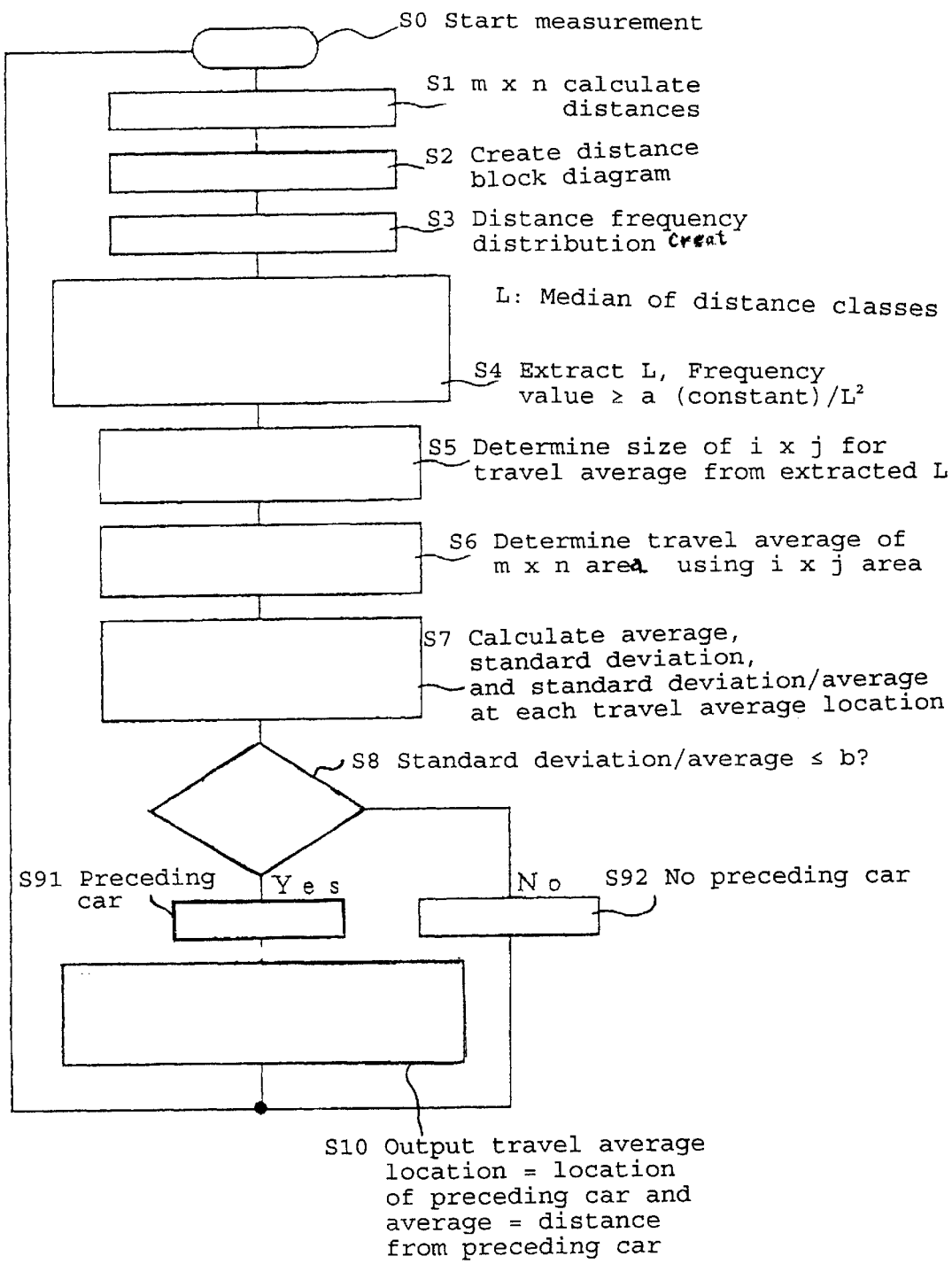

- S0 Start measurement
- S1 m x n calculate distances
- S2 Create distance block diagram
- S3 Distance frequency distribution Creat
- S4 Extract L, Frequency value ≥ a (constant)/$L^2$
  L: Median of distance classes
- S5 Determine size of i x j for travel average from extracted L
- S6 Determine travel average of m x n area using i x j area
- S7 Calculate average, standard deviation, and standard deviation/average at each travel average location
- S8 Standard deviation/average ≤ b?
- S91 Preceding car (Yes)
- S92 No preceding car (No)
- S10 Output travel average location = location of preceding car and average = distance from preceding car

|    | W1  | W2  | W3  | W4  | W5  | W6  | W7  | W8  | W9  | W10  | W11  | W12  |
|----|-----|-----|-----|-----|-----|-----|-----|-----|-----|------|------|------|
| A1 | L11 | L12 | L13 | L14 | L15 | L16 | L17 | L18 | L19 | L110 | L111 | L112 |
| A2 | L21 | L22 | L23 | L24 | L25 | L26 | L27 | L28 | L29 | L210 | L211 | L212 |
| A3 | L31 | L32 | L33 | L34 | L35 | L36 | L37 | L38 | L39 | L310 | L311 | L312 |
| A4 | L41 | L42 | L43 | L44 | L45 | L46 | L47 | L48 | L49 | L410 | L411 | L412 |
| A5 | L51 | L52 | L53 | L54 | L55 | L56 | L57 | L58 | L59 | L510 | L511 | L512 |
| A6 | L61 | L62 | L63 | L64 | L65 | L66 | L67 | L68 | L69 | L610 | L611 | L612 |
| A7 | L71 | L72 | L73 | L74 | L75 | L76 | L77 | L78 | L79 | L710 | L711 | L712 |

Fig. 15(A)

|    | W1  | W2  | W3  | W4  | W5  | W6  | W7  | W8  | W9  | W10  | W11  | W12  |
|----|-----|-----|-----|-----|-----|-----|-----|-----|-----|------|------|------|
| A1 | L11 | L12 | L13 | L14 | L15 | L16 | L17 | L18 | L19 | L110 | L111 | L112 |
| A2 | L21 | L22 | L23 | L24 | L25 | L26 | L27 | L28 | L29 | L210 | L211 | L212 |
| A3 | L31 | L32 | L33 | L34 | L35 | L36 | L37 | L38 | L39 | L310 | L311 | L312 |
| A4 | L41 | L42 | L43 | L44 | L45 | L46 | L47 | L48 | L49 | L410 | L411 | L412 |
| A5 | L51 | L52 | L53 | L54 | L55 | L56 | L57 | L58 | L59 | L510 | L511 | L512 |
| A6 | L61 | L62 | L63 | L64 | L65 | L66 | L67 | L68 | L69 | L610 | L611 | L612 |
| A7 | L71 | L72 | L73 | L74 | L75 | L76 | L77 | L78 | L79 | L710 | L711 | L712 |

Fig. 15(B)

| A11 | A12 | A13 | A14 | A15 | A16 | A17 |
|-----|-----|-----|-----|-----|-----|-----|
| A21 | A22 | A23 | A24 | A25 | A26 | A27 |
| A31 | A32 | A33 | A34 | A35 | A36 | A37 |
| A41 | A42 | A43 | A44 | A45 | A46 | A47 |
| A51 | A52 | A53 | A54 | A55 | A56 | A57 |

Fig. 15(C)

| S11 | S12 | S13 | S14 | S15 | S16 | S17 |
|-----|-----|-----|-----|-----|-----|-----|
| S21 | S22 | S23 | S24 | S25 | S26 | S27 |
| S31 | S32 | S33 | S34 | S35 | S36 | S37 |
| S41 | S42 | S43 | S44 | S45 | S46 | S47 |
| S51 | S52 | S53 | S54 | S55 | S56 | S57 |

Fig. 15(D)

| D11 | D12 | D13 | D14 | D15 | D16 | D17 |
|-----|-----|-----|-----|-----|-----|-----|
| D21 | D22 | D23 | D24 | D25 | D26 | D27 |
| D31 | D32 | D33 | D34 | D35 | D36 | D37 |
| D41 | D42 | D43 | D44 | D45 | D46 | D47 |
| D51 | D52 | D53 | D54 | D55 | D56 | D57 |

**Fig. 17
Prior Art**
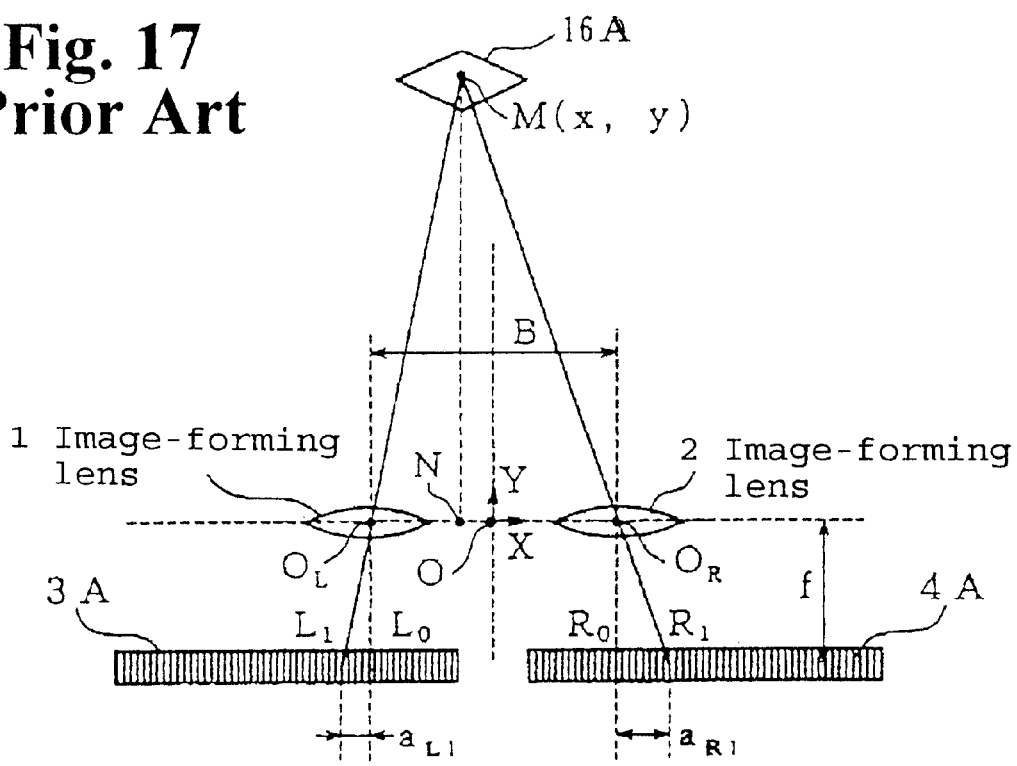
**Fig. 18
Prior Art**
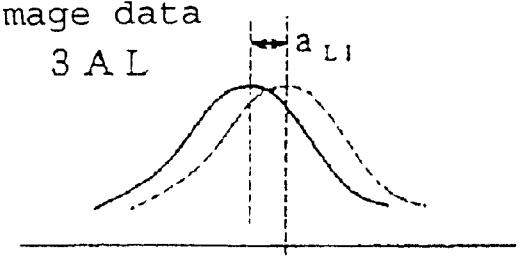
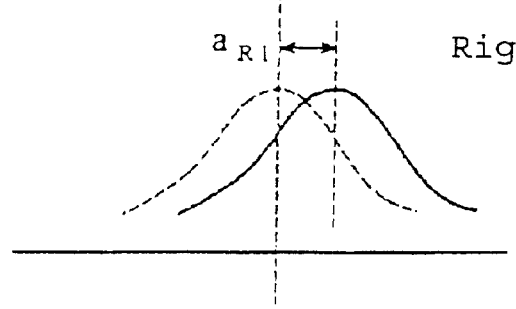

DISTANCE-MEASURING APPARATUS

BACKGROUND OF THE INVENTION AND RELATED ART STATEMENT

The present invention relates to a distance-measuring apparatus that determines the distance from the apparatus and an object, such as a car, by using light-sensitive devices with optical sensor arrays. More specifically, it relates to a distance-measuring apparatus with the capacity to detect defects resulting from malfunctions caused by condensation, cloud, or a foreign particle in light-sensitive windows or from defective elements in the optical sensor arrays.

In the drawings, reference numerals indicate the same or equivalent components throughout the specification.

Conventional techniques for measuring distances between vehicles are first described. Previous inter-vehicle distance-measuring apparatuses measure the distance electronically by comparing images formed by two laterally disposed optical systems and through triangulation.

FIG. 16 shows a conventional inter-vehicle distance-measuring apparatus. In this figure, image-forming lenses 1 and 2 are disposed so that their optical axes are separated at an interval B. Optical sensor arrays 3A and 4A are, for example, CCD linear sensor arrays and are disposed at a focusing distance (f) from the image-forming lenses 1 and 2. The optical sensor arrays 3A and 4A convert images of an object 16A formed by the image-forming lenses 1 and 2 into image signals 30A and 40A, and output to a signal processing section 5.

The signal processing section 5 is made of amplifiers 51 and 52, A/D converters 53 and 54, and a storage device 55. The image signals 30A and 40A from the optical sensor arrays 3A and 4A are amplified by the amplifiers 51 and 52, converted into digital data by A/D converters 53 and 54, and sent to storage device 55 as image data 31A and 41A.

A distance detection circuit 6 disposed at the output of the signal processing section 5 is made of a microcomputer that compares right and left image data 31A and 41A stored in the storage device 55 to calculate the distance from the object 16A, and outputs a distance signal 11.

FIG. 17 is then used to describe a principle for calculating the distances. The midpoints of the image-forming lenses 1 and 2 is defined an origin O to set a horizontal axis X and a vertical axis Y, and the coordinates of image-forming positions $L_1$ and $R_1$ are referred to as $(-a_{L1}-B/2, -f)$ and $(a_{R1}+B/2, -f)$. $a_{L1}$ and $a_{R1}$ are distances on the optical sensor arrays 3A and 4A, as shown in the figure.

The coordinates of the midpoint $O_L$ of the image-forming lens 1 are $(-B/2, 0)$, while the coordinates of the midpoint $O_R$ of the image-forming lens 2 are $(B/2, 0)$. When the coordinates of a point M in the object 16A are referred to as $(x, y)$, the coordinates of the intersection N of a vertical line extending from the point M to the X axis are $(x, 0)$, the coordinates of a position $L_o$ of a vertical line extending from the point $O_L$ to the optical sensor array 3A are referred to as $(-B/2, -f)$, and the coordinates of a position $R_o$ of a vertical line extending from the point $O_R$ to the optical sensor array 4A are referred to as $(B/2, -f)$. In this case, since $\Delta MO_LN$ is similar to $\Delta O_LL_1L_o$ and $\Delta MO_RN$ is similar to $\Delta O_RR_1R_o$, the following Equations 1 and 2 can be established.

$$(x+B/2)f=(a_{L1}+B/2-B/2)y \quad \text{Equation 1}$$

$$(-x+B/2)f=(a_{R1}+B/2-B/2)y \quad \text{Equation 2}$$

Equation 3 can be obtained from Equations 1 and 2. By using Equation 3 to determine the distances $a_{L1}$ and $a_{R1}$ for the image-forming positions $L_1$ and $R_1$, the distance (y) from the object 16A can be calculated.

$$y=B \cdot f/(a_{L1}+a_{R1}) \quad \text{Equation 3}$$

Next, the operation of a distance detection circuit 6 is described. The distance detection circuit 6 compares right and left image data 3AL and 4AR for separately set measuring windows as shown by the solid lines in FIG. 18. If the images do not match, it sequentially shifts the left image data 3AL right and the right image data 4AR left as shown by the broken lines in FIG. 18. When the right and left image data matches, it calculates the amount of the necessary shift.

To determine whether the right and the left image data 3AL and 4AR matches, the following evaluation function is used. The evaluation function is the sum of the absolute values of the differences between pixel data from pixels (in this example, CCD elements) located at corresponding coordinates in measuring windows set in the right and the left optical sensor arrays 3A and 4A, for all pixels in the measuring windows. The value of this evaluation function is examined by sequentially shifting the right and the left measuring windows: shifting the left measuring window left (thus, the left image data 3AL is equivalently shifted right) while shifting the right measuring window right (thus, the right image data 4AR is equivalently shifted left). It is determined that the right and left image data matches when the function value is at its lowest.

The distances $a_{L1}$ and $a_{R1}$ for the right and left image-forming positions $L_1$ and $R_1$ equal to the amount of the shift, so the distance detection circuit 6 uses Equation 3 to calculate the distance (y) from the object 16A based on the amounts of the shift $a_{L1}$ and $a_{R1}$.

FIG. 19 provides an image obtained under normal conditions in detecting the distance from a preceding car 16. In this figure, a distance-measuring range 23 is set within a visual field 22, and the distance from the object (preceding car 16) in the distance-measuring range 23 is detected as an inter-vehicle distance based on the principle of the distance detection.

This conventional technique has the following problems. In addition to the preceding car, there are guideposts and painted patterns of the cross-walks on the roads as shown in FIG. 20, and the device often measures these things appearing in the field of a view 23. Many guideposts and signboards appear alongside the road. In particular, when the road is curved, such objects often appear at the center of the visual field and are mistaken as a car. It is crucial that an apparatus correctly identifies and outputs the distance information only for the preceding car.

To meet this requirement, the apparatus uses an object recognition method by an image processing procedure that extracts and binarizes edges from the image data provided by the variable-density image information from a CCD sensor, before carrying out an area division for the object recognition.

But such an image processing is time-consuming, requiring preprocessing, such as noise removal by filtering a variable-density image, before binarization and extraction of the edges based on the differences among images. Incorporating a faster image processor increases cost and size beyond the practical levels.

One attempt to overcome this difficulty is illustrated in Japanese Patent Application Laid Open No. 8-210848, predecessor to this application (referred hereafter as the first application). The technique used in the first application is incorporated in the application and is briefly described here. This technique attempts a stable, simple and accurate determination of the distance from an object in front of the apparatus by using light-sensitive devices with optical sensor arrays, thereby reducing costs of the distance-measuring apparatus.

FIG. 6 provides a structure of an inter-vehicle distance-measuring apparatus to which the first application is applied. Here, a preceding car 16 travels in the same lane as the car equipped with the apparatus.

The image-forming lenses 1 and 2 are disposed so that their optical axes are separated at an interval B, and the light-sensitive devices 3 and 4 are disposed at the focusing distance (f) (not shown for convenience). Light-sensitive device 3 is composed of (m) optical sensor arrays 31 to 3*m* disposed parallel in a plane perpendicular to the optical axis, while light-sensitive device 4 similarly composed of (m) optical sensor arrays 41 to 4*m* disposed parallel in a plane perpendicular to the optical axis, so that 31 and 41, 3*i* and 4*i*, and 3*m* and 4*m* have the same visual fields, respectively.

An image of the object formed by the image-forming lens 1 is converted into image signals 30*l* to 30*m* by the optical sensor arrays 3*l* to 3*m*, while an image of the object formed by the image-forming lens 2 is converted into image signals 40*l* to 40*m* by the optical sensor arrays 4*l* to 4*m*. The signals are then sent to a signal processing section 5.

The signal processing section 5 is composed of amplifiers 51*l* to 51*m* and 52*l* to 52*m*, A/D converters 53*l* to 53*m* and 54*l* to 54*m*, and a storage device 55. Image signals 301 to 30*m* from the optical sensor arrays 31 to 3*m* of the light-sensitive device 3 are amplified by the amplifiers 511 to 51*m*, converted into digital data by the A/D converters 531 to 53*m*, and stored in the storage device 55 as the image data 311 to 31*m*.

Likewise, the image signals 401 to 40*m* from the optical sensor arrays 41 to 4*m* of the light-sensitive device 4 are amplified by the amplifiers 521 to 52*m*, converted into digital data by the A/D converters 541 to 54*m*, and stored in the storage device 55 as the image data 411 to 41*m*.

As in FIG. 16, the distance detection circuit 6 is a microcomputer that calculates the distance from the object within the distance-measuring range in the measuring visual fields of the optical sensor arrays 31, 41, 3*i*, 4*i*, 3*m* and 4*m*, from the right and left image data 311, 411,, 31*i*, 41*i*, 31*m* and 41*m* stored in the storage device 55.

A distance block diagram extraction section 7 divides the distance-measuring range 23 within the measuring visual field 22 into m×n (m: a natural number indicating the number of the optical sensor arrays on one side; n: a natural number indicating the number of the measuring windows in the optical sensor arrays) distance blocks with addresses to create a distance block diagram 24 with a collection of the measuring distance information in each block, as shown in FIGS. 10 and 11. This distance block diagram is a collection of m×n distance measured data.

For example, a case, in which the number (m) of the optical sensor arrays is 7 and the number of the measuring windows in the longitudinal direction of the optical sensor arrays is 12, is described with reference to FIGS. 10 and 11. In this figure, optical sensor arrays A1 to A7 are disposed in this order from the top of the distance measuring range 23, measuring points W1 to W12 in the longitudinal direction of the optical sensor arrays are disposed in order from left, and the measured distance at the measuring point Wj on the optical sensor array Ai is referred to as Lij. In the example, the distance for 7×12 blocks within the measuring visual field 22 can be detected, and as a result, the distance block diagram 24 is extracted.

FIG. 12 is used to describe a principle for measuring distances for a plurality of points in the optical sensor arrays.

The distance-measuring apparatus here has the same structure as in FIG. 16, except that each sensor array is partitioned into a plurality of regions (measuring windows). FIG. 12 shows the case, wherein the optical sensor array is partitioned into regions (1), (2) and (3).

The measuring window regions (1), (2) and (3) may be set so that some optical sensor elements (in this case, CCD elements) partly constituting the optical sensor arrays are subjected to overlap between the corresponding measuring window regions (that is, some CCD elements belong to two adjacent measuring window regions).

It is assumed that objects $O_1$, $O_2$ and $O_3$ for which the distance is to be measured are disposed in three directions relative to the distance-measuring apparatus shown by alternate long and short dash lines (that is, the direction of the center line and two directions on both sides of the center line at an angle $\alpha$), and that objects are located at distances $L_1$, $L_2$ and $L_3$, respectively. The regions (1), (2) and (3) in each of the optical sensor arrays 3 and 4 correspond to the objects $O_1$, $O_2$ and $O_3$.

In other words, an image of the object $O_1$ located on the left of the center line at an angle $\alpha$ is simultaneously formed on the regions (1) in the pair of optical sensor arrays 3 and 4, an image of the object $O_2$ located on the center line is simultaneously formed on the regions (2) in the pair of optical sensor arrays 3 and 4, and an image of the object $O_3$ located on the right of the center line at an angle $\alpha$ is simultaneously formed on the regions (3) in the pair of optical sensor arrays 3 and 4. The distances $L_1$, $L_2$ and $L_3$ from the objects $O_1$, $O_2$ and $O_3$ can be expressed by the following Equations 4 to 6. Distances B, f, U11, U12, U13, U21, U22 and U23 in these equations are shown in FIG. 12.

$L_1 = B \cdot f/(U21-U11)$   Equation 4

$L_2 = B \cdot f/(U22+U12)$   Equation 5

$L_3 = B \cdot f/(U13-U23)$   Equation 6

Since each degree of shift (U21, U11, U22, U12, U13 and U23) can be determined by the distance detection circuit 6 based on the image data on the optical sensor arrays 3 and 4, Equations 4 to 6 can be used to determine the distances $L_1$, $L_2$ and $L_3$.

A distance signal 12 from the distance block diagram extraction section 7 obtained in this way is sent to a distance selection section 8 in FIG. 6. The distance selection section 8 determines a distance frequency distribution of the distances in the distance signals 12, selects from the distance signals 12 only the distance from the preceding car 16, and sends it to a travel average processing section 9 as a distance signal 13.

Next, the operational principle of the distance selection section 8 is described with reference to FIG. 13. In FIG. 13, the horizontal axis indicates distance classes K divided based on a class width $\Delta L$ while the vertical axis indicates a frequency distribution value belonging to each class. The distance signal 12 is fractionized or classified in this manner. As shown in FIG. 14, the area in the distance-measuring range 23 occupied by the preceding car 16 depends on the distance between the device and the preceding car 16, so that the number of measured data presumably used to measure the distance from the preceding car 16 depends on the inter-vehicle distance.

In general, when the inter-vehicle distance increases (n)-fold, the area in the measuring range occupied by the preceding car 16 becomes $(1/n)^2$ based on similarity. That is, the number of measured data used to measure the distance from the preceding car 16 is easily estimated at $(1/n)^2$.

Thus, the number of measured data used to measure the distance from the preceding car 16 (frequency distribution value) can be given by Equation 7.

$Y=a/K^2$ ($Y$: frequency distribution value, $a$: constant, $K$: distance class (distance)) Equation 7

The constant (a) is determined by the size of the preceding car 16 and the shape of the distance-measuring apparatus. The description of a specific method for determining the constant is omitted. A curve or value Y is delineated by the broken line in FIG. 13, and median L (=(K2+K3) /2) of the distance class K with a frequency distribution value extending up to the upper region of the curve Y is used as a candidate for the distance from the preceding car 16 and is outputted to a travel average processing section 9 as a distance signal 13.

Based on the distance signal 13, the travel average processing section 9 performs travel average processing within the 7×12 distance blocks, and transmits to a preceding car recognition section 10 (i.e. preceding object recognition section) a distance average at each travel average location and the results 14 of the travel average processing with a standard deviation/distance average thereat.

The operational principle of travel average processing is described by using FIG. 15. First, the size of the distance blocks i×j (i: m or a smaller natural number, j: n or a smaller natural number) for which a travel average is determined from the distance signal 13 (median L of the distance classes) is determined. The size of the distance blocks is determined by the inter-vehicle distance from the preceding car 16 based on the distance signal 13, the size of the preceding car 16, and the shape of the distance-measuring apparatus.

The travel average processing is explained here in reference to the 7×12 distance block diagram described above. If the size of the distance blocks for which a travel average is determined is 3×6, the results of the travel average processing for FIG. 15(A) can be expressed by FIGS. 15(B) to 15(D). When the measured distance on the i-th sensor array in the j-th window position is referred to as Lij, Aij, Sij, and Dij in FIGS. 15(B). 15(C) and 15(D) can be expressed by following Equations 8 to 10.

$Aij=\{^{i+2,j+5}\Sigma_{i,j}(L_{ij})\}/(3\times6)=AVG$ Equation 8

$Sij=[\{^{i+2,j+5}\Sigma_{i,j}(L_{ij}-AVG)^2\}/(3\times6)]^{1/2}$ Equation 9

$Dij=Sij/Aij$ Equation 10

AVG in Equation 8 indicates a distance average.

For example, the average of the distances in the oblique line region in FIG. 15(A) is indicated by the oblique line region in FIG. 15(B), the standard deviation is indicated by the oblique line part in FIG. 15(C), and the standard deviation/distance average is indicated by the oblique line part in FIG. 15(D).

The preceding car recognition section 10 as a preceding object recognition section is connected to the travel average processing section 9 to determine whether the measured object in front of the apparatus is the preceding car 16, based on the distance average, standard deviation, and standard deviation/distance average as the results of a travel average processing 14 transmitted from the travel average processing section 9.

This determination uses the Dij value for the upper-leftmost Lij of the distance blocks for which a travel average is determined. If this value is smaller than a certain standard value (b), it is determined that the preceding car is at the inter-vehicle distance expressed by the distance average Aij at a travel average location in Lij, and the location of the preceding car 16 and the inter-vehicle distance from the preceding car 16 are sent to an external alarm device as information 15 on the preceding car.

FIG. 7 shows a flow chart of the processing used in the example above. The distance detection circuit 6 uses the data in the storage device 55 in the signal processing section 5 to calculate m×n measured distance information (S1); based on this information, the distance block diagram extraction section 7 creates a distance block diagram (S2).

The distance selection section 8 subsequently determines a distance frequency distribution (S3) and extracts the median L of the distance classes K (S4).

The travel average processing section 9 determines the size i×j of the distance blocks for which a travel average is determined based on the median L (S5), and determines the travel average of the m×n area (S6).

Next, the travel average processing section 9 calculates a distance average, standard deviation, and standard deviation/distance average at each travel average location and transmits this data to a preceding car recognition section 10 (S7).

The preceding car recognition section 10 compares the standard deviation/distance average with a standard value (b) (S8). If it determines that there is a car in front of the apparatus (S91), the preceding car recognition section 10 outputs the travel average location and distance average as the location of the preceding car and distance from the preceding car, respectively (S10). If it determines that there is no car in front of the apparatus (S92), the processing is finished.

For reliable capture of the preceding car 16, the measuring visual field should be as large as possible. To this end, the longitudinal length of the optical sensor arrays may be increased, or many pairs of optical sensor arrays may be employed. But such a method increases the size of the apparatus and provides significantly faded images at the ends of the light-sensitive device due to aberration of the image-forming lens, resulting in degradation and requiring further complications in the processing circuits, such as amplifiers, A/D converters.

Thus, in the example of the structure in FIG. 8, the distance-measuring apparatus 01 has an optical axis that oscillates radially. In FIG. 8, a control circuit section 18 is connected to a distance-measuring apparatus oscillating motor 17 and a signal processing section 5 to transmit control signals 19 and 20 to the motor 17 and the signal processing section 5. The motor 17 is mechanically linked to the distance-measuring apparatus body 01 to oscillate the distance-measuring apparatus body 01 based on the control signal 19, so that the optical axis of the body oscillates radially.

In the illustrative structure in FIG. 9, the distance-measuring apparatus is composed of a distance-measuring apparatus body 01 disposed in place and a reflecting mirror 21, oscillating to allow light to be radially incident on the distance-measuring apparatus body 01. A control circuit section 18 is connected to a reflecting mirror driving motor 17 and a signal processing section 5 to output control signals 19 and 20 to the motor 17 and the signal processing section 5. The motor 17 is mechanically linked to the reflecting mirror 21 to oscillate the reflecting mirror 21 based on the control signal 19 in order to allow light to be radially incident on the distance-measuring apparatus body 01.

Techniques for identifying the regions within the visual fields of the light-sensitive devices 3 and 4 in which the preceding car is present include the proposal in Japanese Patent Application Laid Open No. 7-280563 that is a previous application of the applicant (referred hereafter as the second previous application), as well as the first application described above. The second previous application is briefly described. A line detection section detects as a lane the image at a location on each optical sensor array of at least one of the light-sensitive devices at which light quantity distribution has a maximum value. Next, a distance-measuring range detection section detects a possible horizontal location range for the preceding car based on a signal from the line detection section indicating the location of the line. Then, by triangulation, the distance detection section calculates an inter-vehicle distance based on a location within the possible location range at which an image of the preceding car is formed.

The line detection method incorporates the following three methods. The first method detects as a line an image obtained when an image-formed location that has a maximum value of a light quantity distribution is maintained within a set range for a set period of time. The second method detects as a line an image obtained when a straight line joining those image-formed locations on the two optical sensor arrays passes through a range set around those image-formed locations on other optical sensor arrays, which also have maximum values for a light quantity distribution. The third method detects as a line an image obtained when the width of an object determined from (a) the distance from the object determined from the image-formed location having a maximum value of a light quantity distribution and (b) the width of the images is within a set range. A line, as referred to here, includes white lines and others, including, for example yellow lines.

In the distance-measuring apparatus described above, if visibility is reduced by condensation or fouling of lenses or protective transparent cover glasses, a distance-measuring may become inaccurate or even impossible. If an optical sensor element, i.e. CCD element, as a pixel in the optical sensor arrays is defective, any evaluation function using an output from this defective element is invalid and prevents accurate distance calculation.

One object of this invention is to overcome these difficulties and to provide a distance-measuring apparatus capable of accurately calculating distances.

SUMMARY OF THE INVENTION

To achieve this object, a distance-measuring apparatus according to a first aspect of the invention includes a pair of light-sensitive devices (3 and 4) comprising optical sensor arrays (31 to 3m and 41 to 4m) disposed parallel at a specified interval on image-forming surfaces corresponding to parallel optical axes of optical systems (cover glasses CG, image-forming lenses 1 and 2, and so on), the light-sensitive devices being disposed in the axial direction of the optical sensor arrays, the apparatus using image data (311 to 31m and 411 to 41m) from the optical sensor arrays in the pair of the light-sensitive devices to determine (via a car region detection and measuring section 91) the distance from an object (such as a preceding car 16) in front of the apparatus. The apparatus includes means (101) for detecting defects and for emitting an alarm (102) if optical sensor elements in each of a plurality of measuring windows set in the optical sensor arrays detect low-contrast conditions, or if abnormal conditions of an evaluation function determined for each of the plurality of measuring windows continue for a specified duration or longer.

A distance-measuring apparatus according to a second aspect is based on the apparatus set forth in the first aspect, wherein when the number of measuring windows indicating low-contrast conditions exceeds a specified value, and when such measuring windows exist in both light-sensitive devices, defective visibility detection circuit trips an alarm to indicate malfunction caused by condensation (F) or fog in the optical system.

A distance-measuring apparatus according to a third aspect is based on the apparatus set forth in the first aspect, wherein when the number of measuring windows indicating low-contrast conditions is smaller than the number of all measuring windows in the optical sensor arrays, and when such measuring windows exist in only one light-sensitive device, or when an evaluation function determined for the plurality of measuring windows, the number of which is smaller than that of all the measuring windows in the optical sensor arrays, is in an abnormal state, the defective visibility sensor trips an alarm, indicating a malfunction caused by a foreign particle (SP) in the optical system.

A distance-measuring apparatus according to a fourth aspect of the invention includes a pair of light-sensitive devices made of optical sensor arrays (31 to 3m and 41 to 4m) disposed parallel at a specified interval on image-forming surfaces corresponding to parallel optical axes of optical systems (image-forming lenses 1 and 2 and the like), the light-sensitive devices (3, 4) being disposed in the axial direction of the optical sensor arrays and the apparatus using image data (311 to 31m and 411 to 41m) from the optical sensor arrays to calculate via a distance detection circuit (6A) an evaluation function (FE) for each pair of measuring windows set in each pair of the optical sensor arrays, in order to detect the distance from an object (a preceding car 16) in front of the apparatus. The apparatus includes a defective pixel sensor (201) that detects a defective optical sensor element ($P_k$), by calculating the absolute value ($|P_{k+1}-P_k|$ or/and $|P_k-P_{k-1}|$) of the difference between the image data from the optical sensor element ($P_k$) and the adjacent optical sensor elements ($P_{k+1}$ or/and $P_{k-1}$); if the value exceeds a specified threshold (THa), it outputs defective pixel position information (defective pixel information 202) identifying at least the pixel position.

In addition, a distance-measuring apparatus according to a fifth aspect includes means (distance detection circuit 6A) for removing the defective pixel from the calculations of an evaluation function for distance detection, based on the defective pixel position.

In addition, a distance-measuring apparatus according to a sixth aspect is based on the apparatus set forth in the fourth aspect, wherein the defective pixel sensor detects the defective pixels at a turning-on of the distance-measuring apparatus, and/or at a specified interval during the on-condition of the power.

In addition, a distance-measuring apparatus according to a seventh aspect is based on the apparatus set forth in the fourth or sixth aspect, wherein the defective pixel sensor outputs an alarm signal (203) indicating the presence of the defective pixels together with the defective pixel position information.

In addition, a distance-measuring apparatus according to an eighth aspect is based on the apparatus set forth in any of the first to seventh aspects, wherein the object located in front of the apparatus and for which the distance from the apparatus is to be detected is a vehicle.

BRIEF DESCRIPTION OF THE DRAWINGS

FIGS. 2(A) and 2(B) show examples of the distribution of outputs from CCD elements in optical sensor arrays when visibility is poor due to condensation on cover glasses of light-sensitive devices;

FIGS. 3(A) and 3(B) show examples of the distribution of outputs from the CCD elements in the optical sensor arrays when visibility is defective due to a foreign particle on the cover glasses of the light-sensitive devices;

FIG. 7 is a flow chart for showing processing by the apparatus of FIG. 6;

FIGS. 15(A)–15(D) show a principle for the operation of a travel average processing section of FIG. 6;

FIG. 17 shows a principle for calculating a distance of FIG. 16;

FIG. 18 shows a principle for the operation of a distance detection circuit of FIG. 16;

DETAILED DESCRIPTION OF PREFERRED EMBODIMENTS

Figure 1:
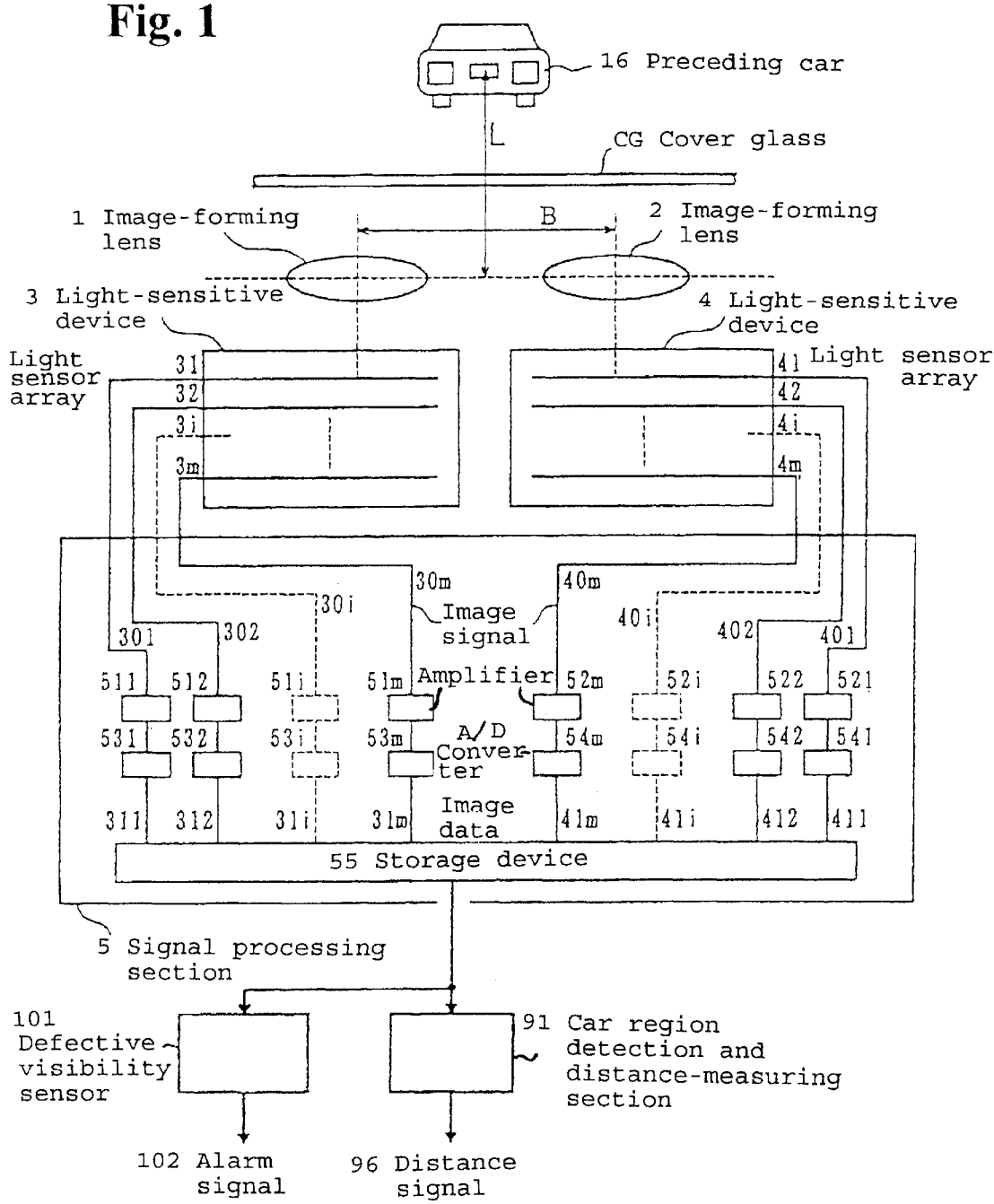
FIG. 1 is a block diagram for showing a structure of a main part of one embodiment of the invention.
Figure 6:
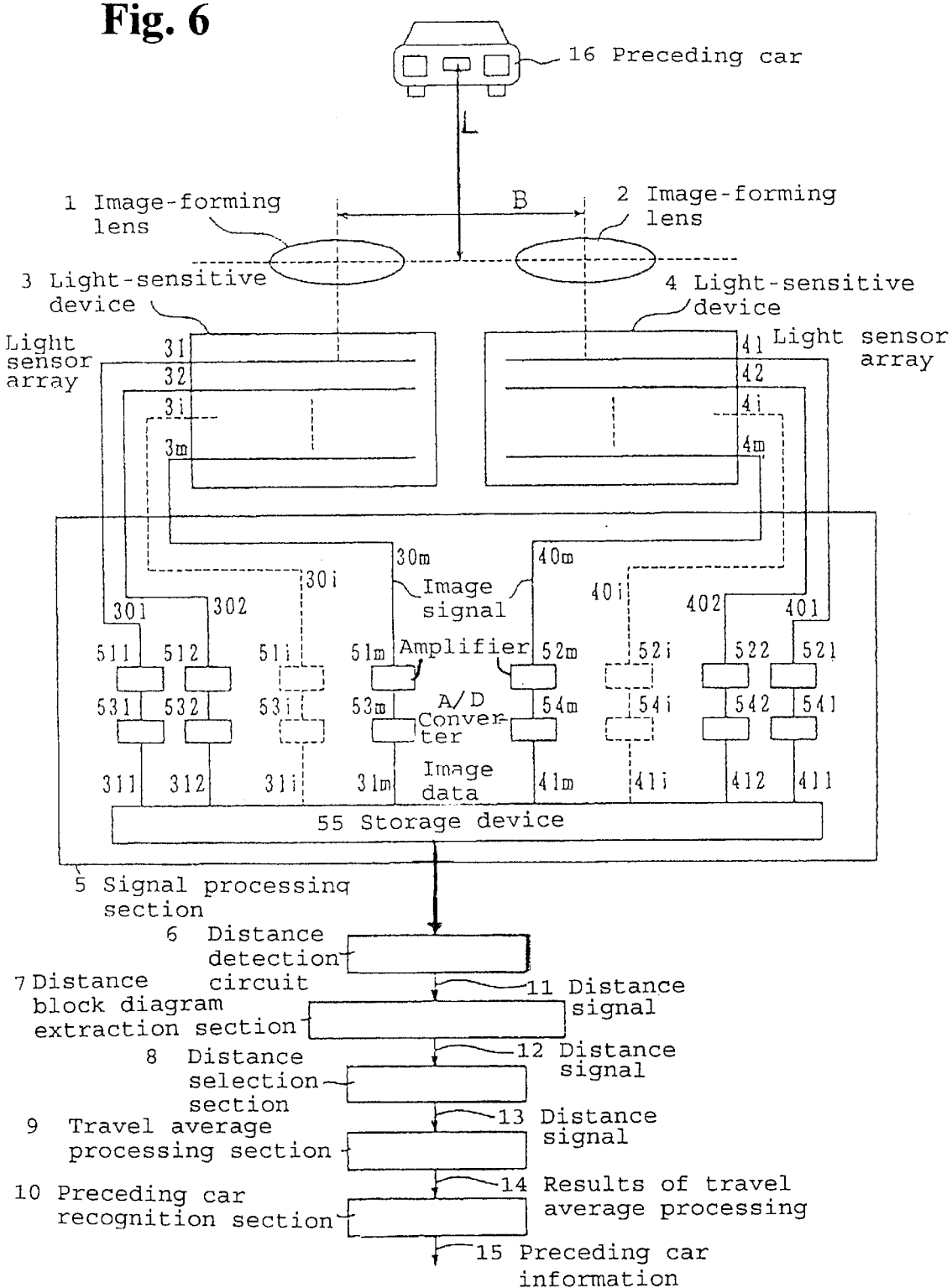
FIG. 6 shows an example of a structure of an inter-vehicle distance measuring apparatus based on the first previously applied technique.
Figure 8:
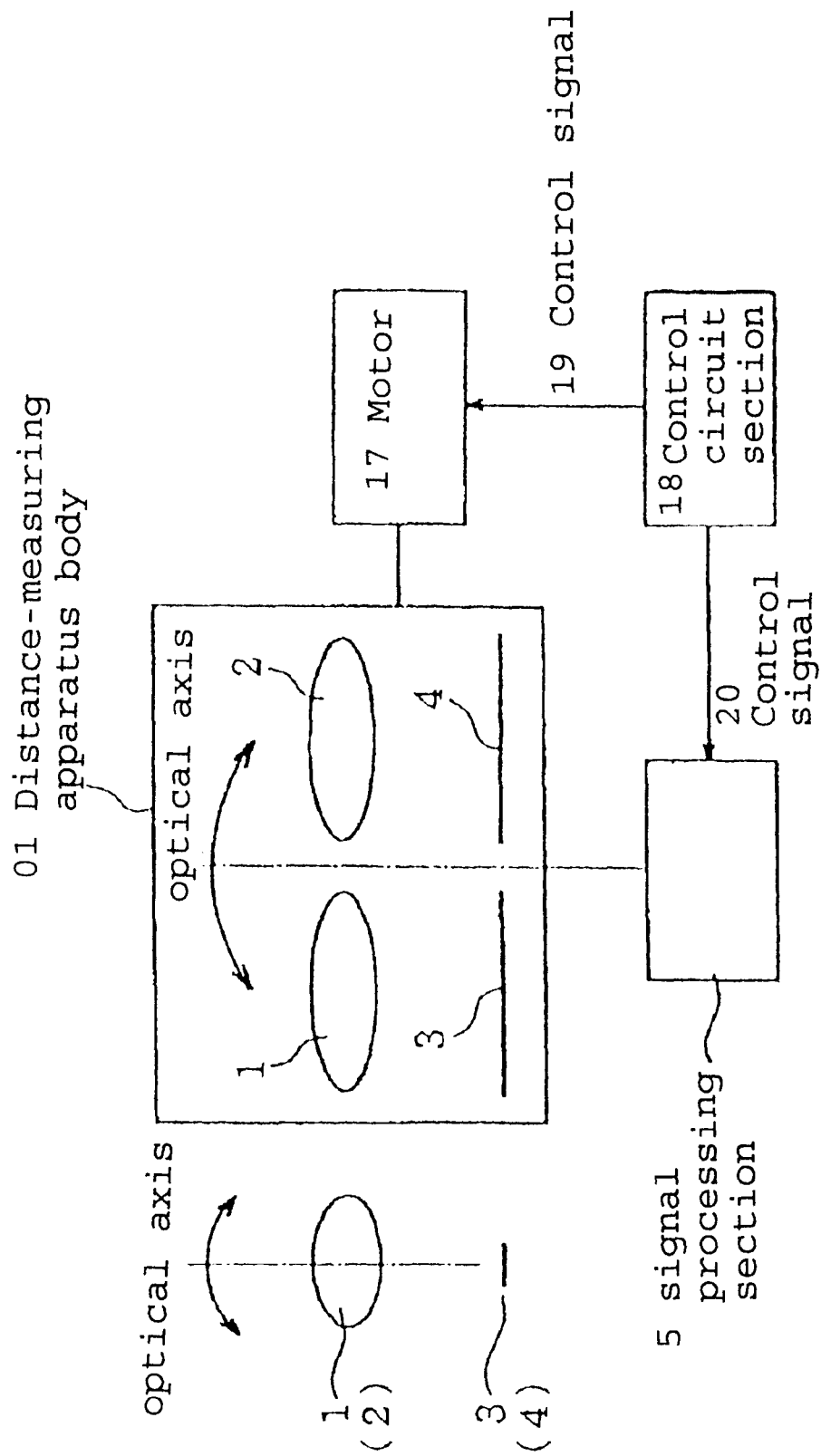
FIG. 8 is a block diagram for showing a different example of an imaging mechanism section of FIG. 6.
Figure 9:
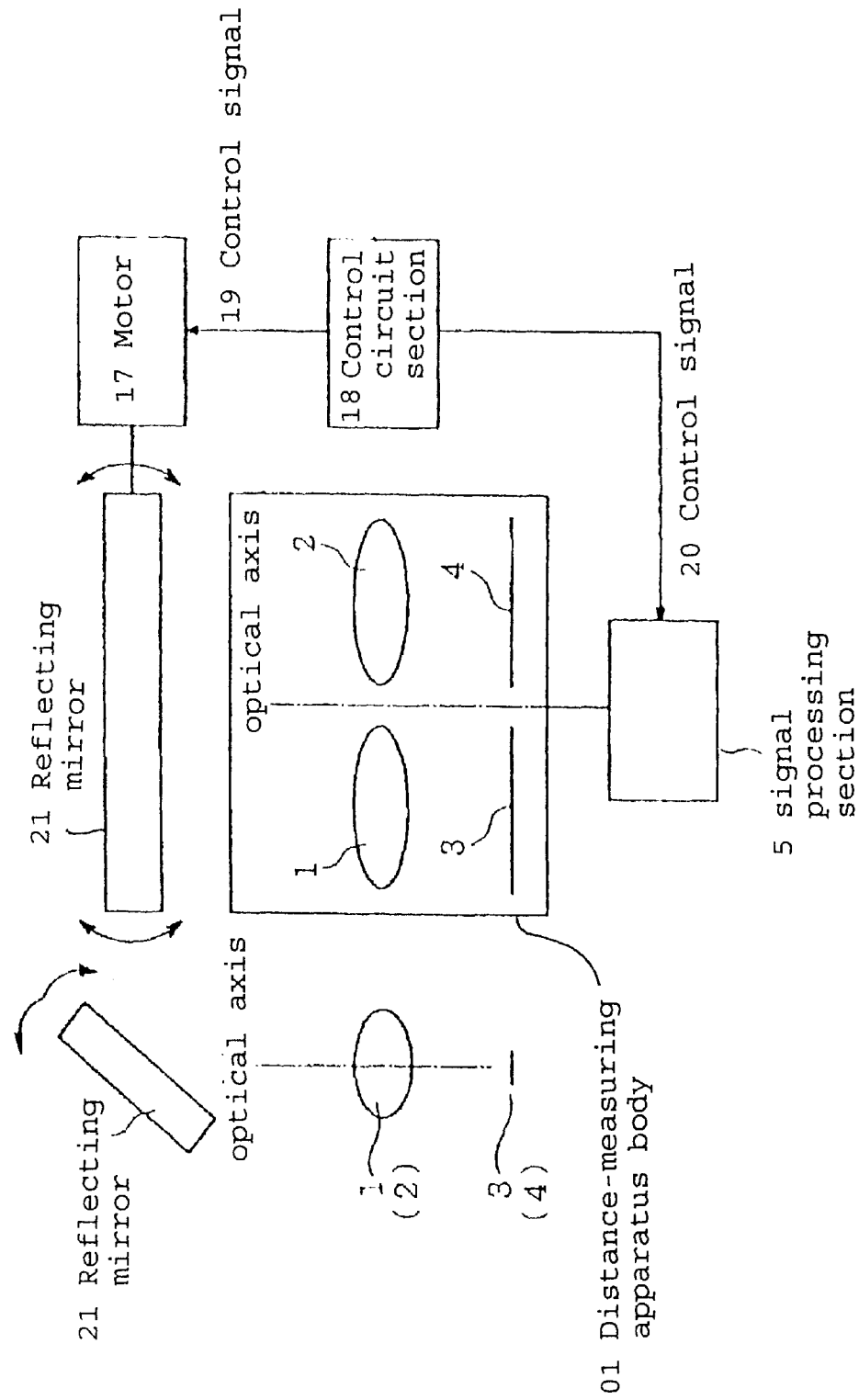
FIG. 9 is a block diagram for showing another different example of an imaging mechanism section of FIG. 6.
Figures 10, 11:
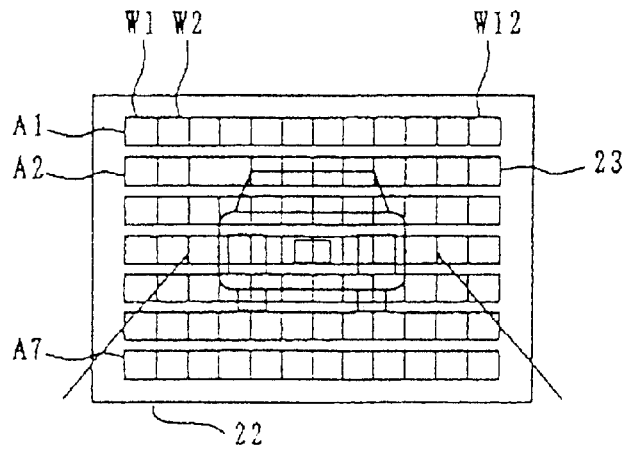
FIG. 10 describes a measuring visual field and a distance-measuring range of FIG. 6.
FIG. 11 is an illustration of a distance block diagram of FIG. 6.
Figure 12:
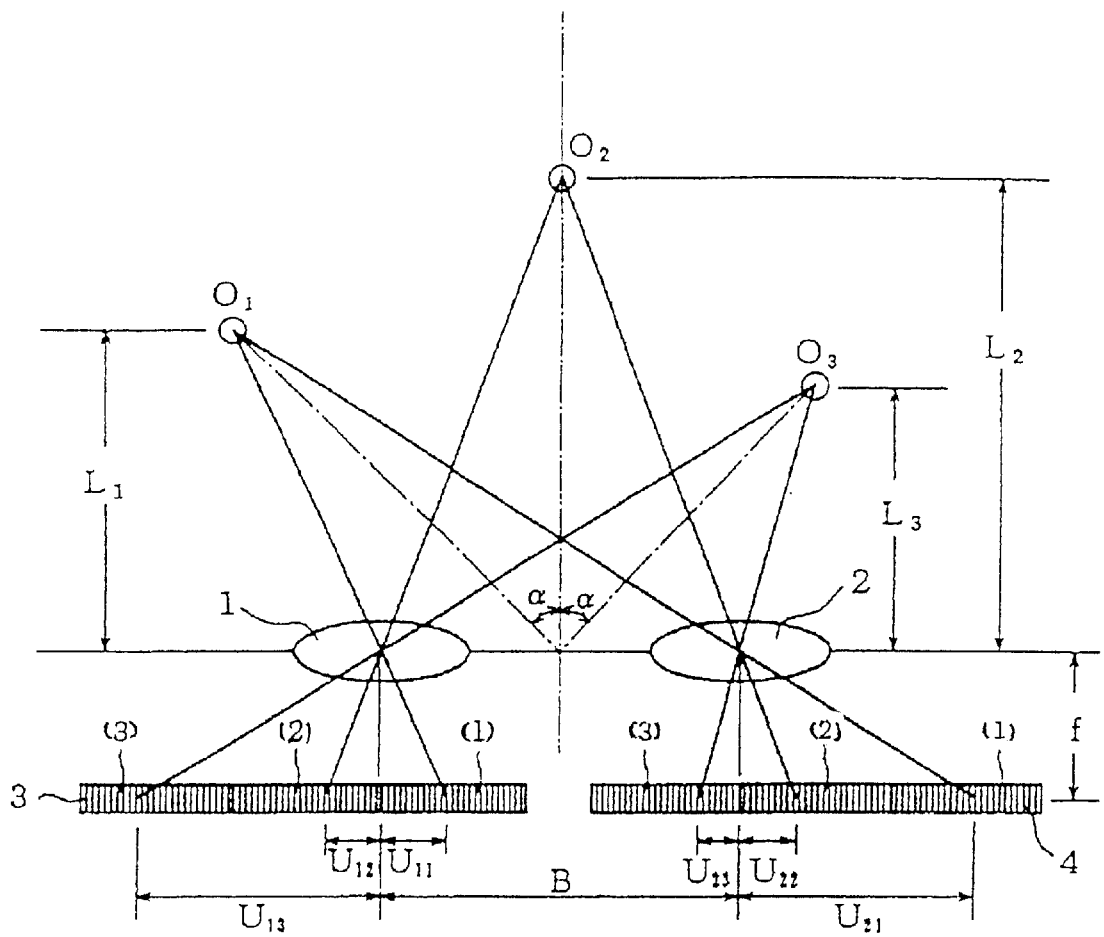
FIG. 12 shows a principle for measuring distances from a plurality of points in the longitudinal direction of the optical sensor arrays of FIG. 6.

FIG. 1 shows a structure of a main part of an inter-vehicle distance-measuring apparatus as one embodiment of this invention, which corresponds to FIG. 6. In FIG. 1, CG is a transparent cover glass disposed in front of image-forming lens 1 and 2 to protect an optical system; 91 is a car region detection and distance-measuring section for detecting from image data stored in a storage device 55 the region in which a car is present, detecting the distance from an object in this region (presumably corresponding to the preceding car) and outputting a distance signal 96 indicating this distance, the car region detection and distance-measuring section 91 encompassing means 6 to 10 in FIG. 6. The distance signal 96 corresponds to an inter-vehicle distance represented by a distance average at a travel average location, when it is determined that a car appears before the apparatus in FIG. 6.

That is, the distance signal 96 in FIG. 1 is included in the preceding car information 15 in FIG. 6. In addition, reference numeral 101 designates the defective visibility detection sensor that is the subject of this invention.

In order to describe a first embodiment (hereafter referred to as Embodiment 1) of the defective visibility sensor 101, FIG. 2(A) and 2(B) show the distribution of outputs from the CCD elements in the optical sensor arrays when visibility is defective. FIG. 2(A) shows a state in which a cover glass CG is fogged, and F denotes condensation adhering to the surface of the cover glass CG.

FIG. 2(B) shows a distribution of the outputs from the respective CCD elements in a pair of optical sensor arrays (selected from 31 to 3m and 41 to 4m) in the right and left light-sensitive devices 3 and 4, i.e. an example of the relationship between the output from the CCD elements (vertical axis) and pixel number (hereafter simply referred to as pixel NO; horizontal axis) of the CCD elements as array coordinates in which visibility is defective due to the fogged cover glass CG or image-forming lens 1 or 2. There are only small differences among the outputs from the CCD elements in both right and left optical sensor arrays, resulting in a low-contrast.

In Embodiment 1, if a low-contrast condition of the output from the CCD elements in each of a plurality of the measuring windows set in the optical sensor arrays, the number of which is a specified value or larger, is present in both right and left light-sensitive devices 3 and 4 and continues for a specified duration or longer, the defective visibility determination means 101 determines that malfunction is occurring due to condensation and outputs an alarm signal 102 indicating this condition.

The low-contrast condition of the outputs from the CCD elements in the measuring windows indicates that (a) the difference between maximum and minimum values of the output from the CCD elements in the measuring windows is a specified threshold or smaller; and (b) the sum of the absolute values of the differences among the outputs from the CCD elements is a specified threshold or smaller, as indicated by Equation 11.

That is, if the pixel value of the i-th pixel (output from the CCD element) is referred to as Pi; the leading pixel of the measuring window is referred to as iO; the width expressed by the number of the pixels in the measuring window is referred to as W, and the threshold of this determination is referred to as C, then Equation 11 can be expressed as follows.

$$^{io+w-1}\Sigma_{i=io}|P_{i+1}-P_i|\leq C \qquad \text{Equation 11}$$

FIGS. 3(A) and 3(B) show the distributions of the output from the CCD elements in the optical sensor arrays when visibility is defective in order to describe a second embodiment (hereafter referred to as Embodiment 2) of the operation of the defective visibility sensor 101. FIG. 3(A) shows an example in which a foreign particle SP adheres to a part of a cover glass CG, and FIG. 3(B) compares the distribution of the output from the CCD elements in the optical sensor arrays in the left light-sensitive device 3 in this example which receives an image SPa by the foreign particle SP, to the distribution of the output from the CCD elements in the optical sensor arrays in the right light-sensitive device 4, which form a pair with the above optical sensor arrays, with each distribution shown on a pixel number basis. As shown in these figures, the part of the distribution of the output from the CCD arrays in the left optical sensor arrays which receive the image SPa of the foreign particle has a low-contrast as described above.

In addition, if the foreign particle SP is present in the optical system, it does not generally equally present in both right and left optical systems, so that the left image including the image SPa of the foreign particle differs from the right image. If the right and left images are different from each other or the contrast is low due to the foreign particle as described above, the evaluation function for determining whether the right and left images match becomes abnormal.

The evaluation function is said to become abnormal if: (a) it has no minimum value, i.e. the evaluation function monotonously increases or decreases; (b) it has a plurality of very small values, so that the minimum value can not be determined; (c) the slope near the minimum value of the evaluation function has a smaller value than a specified threshold; or (d) the minimum value of the evaluation function is a specified threshold or larger, i.e. the right and left images do not match well.

In Embodiment 2, if the low-contrast condition from the output of the CCD elements in each of a plurality of the measuring windows, the number of which is smaller than the number of all the measuring windows in the optical sensor arrays, is present in only one of the right and left light-sensitive devices 3 and 4 and continues for a specified duration, or if an abnormal condition of the evaluation function determined for each of a plurality of measuring windows, the number of which is smaller than the number of all the measuring windows in the optical sensor arrays, continues for a specified duration, then the defective visibility sensor 101 determines that a malfunction is occurring due to a foreign particle and outputs an alarm signal 102, alerting the operator to clean the cover glass CG.

Figure 4:
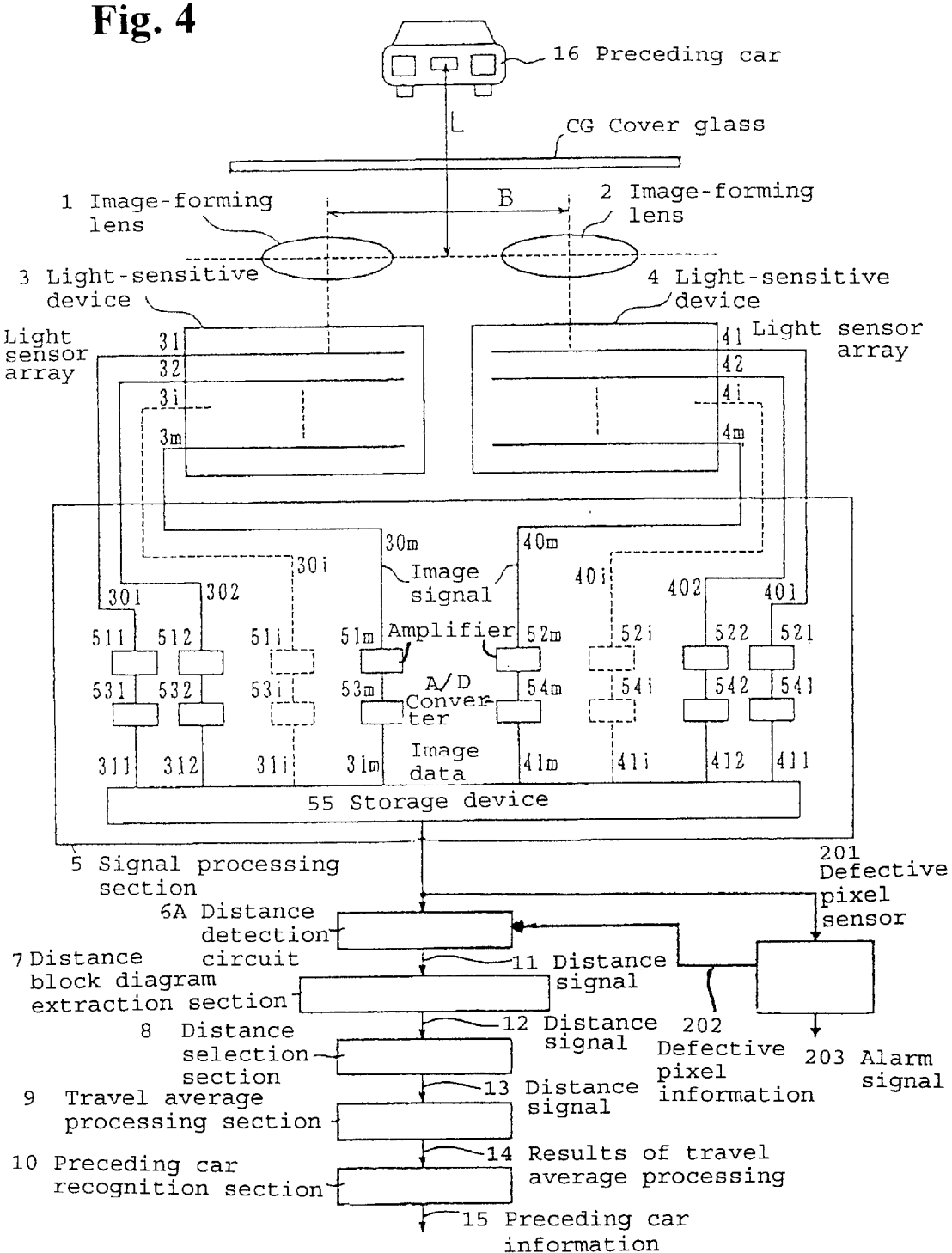
FIG. 4 is a block diagram for showing a structure of a main part of one embodiment of the invention.

FIG. 4 shows a structure of a main part of an inter-vehicle distance-measuring apparatus as one embodiment of this invention and corresponds to FIG. 6. Unlike FIG. 6, FIG. 4 incorporates a distance detection circuit 6A and a defective pixel detection circuit 201 between the storage device 55 and distance detection circuit 6A.

The defective pixel sensor 201 first detects defective pixels from the image data 311 to 31m and 411 to 41m in the optical sensor arrays 31 to 3m and 41 to 4m in the right and left light-sensitive devices 3 and 4 in the storage device 55, then transmits to the distance detection circuit 6A the defective pixel information 202, including pixel coordinates, and sends an alarm signal 203 to inform the operator of the presence of the defective pixel.

The distance detection circuit 6A has functions basically similar to those of the distance detection circuit 6 in FIG. 6. Based on the image data 311 to 31m and 411 to 41m in the storage device 55, it determines an evaluation function from the difference between the image data from the corresponding pixels in the pair of the measuring windows set in the lateral pair of the optical sensor arrays, in order to detect the distance from the object represented by the images. The distance detection circuit 6A differs from the distance detection circuit 6 in FIG. 6 only in that the evaluation function is determined only after defective pixels have been removed based on the defective pixel information 202.

Figure 5:
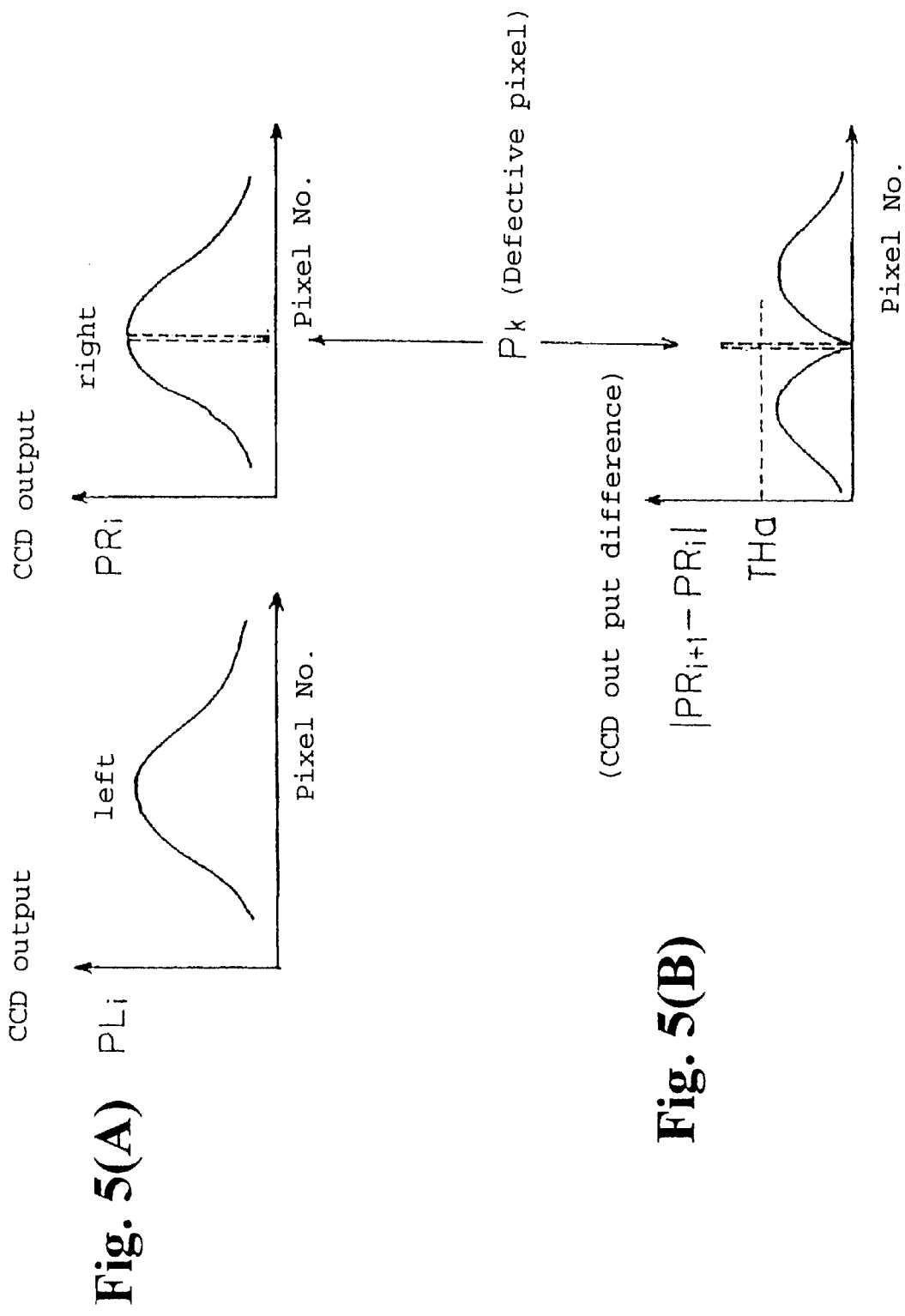
FIGS. 5(A) and 5(B) show image distributions to describe the operation of a defective pixel sensor in FIG. 1.

FIGS. 5(A) and 5(B) show image distributions to illustrate the operation of the defective pixel sensor 201. FIG. 5(A) shows an example of an image distribution in a pair of the measuring windows set in a pair of the optical sensor arrays in the right and left light-sensitive devices 3 and 4. The horizontal axis of the two image distributions in FIG. 5(A) indicates pixel number (hereafter simply referred to as pixel NO; (i) is a numerical value) as the coordinate of the CCD elements. The vertical axis PLi of the left image distribution indicates an output from the CCD elements as a pixel value (image data) of the i-th pixel of the left optical sensor arrays, and the vertical axis PRi of the right image distribution indicates an output from the CCD elements as a pixel value (image data) of the i-th pixel of the right optical sensor arrays. This example shows that a defective pixel $P_k$ with a very small pixel value happens to occur at the peak of the image from the right optical sensor array.

The evaluation function is defined as the sum of the absolute values of the differences between the corresponding pixels in the right and left measuring windows, the sum being calculated for all pixels in the measuring windows. If the number for the pixels located at the starting points of the lateral pair of the measuring windows is referred to as ls and rs, and the width expressed by pixel numbers in the measuring windows is referred to as W, an function FE can be expressed by Equation 12.

$$FE = {}^{w-1}\Sigma_{i=o}|PL_{ls+i} - PR_{rs+i}| \qquad \text{Equation 12}$$

It is clear that the correct distance from the object can not be calculated if the pixel value of the defective pixel $P_k$ is incorporated into the evaluation function FE.

FIG. 5(B) shows the distribution of the absolute values $|PR_{1+1} - PR_i|$ of the differences between the pixel values of the adjacent pixels in the right optical sensor arrays, compared to the right image distribution in FIG. 5(A). As shown in this figure, the absolute value of the difference between the pixel values of the adjacent pixels normally discontinuously indicates a value significantly above a specified threshold THa at the defective pixel. On turning-on, the defective pixel sensor 201 first determines the absolute value of the differences between the values for the adjacent pixels in order to detect defective pixels by using Equations 13 and/or 14.

When the value of a defective pixel is $P_k$ and its pixel number is (k), defective pixel $P_k$ can be identified because the absolute values of the differences between the values for the defective pixel and adjacent pixel are at or above the threshold Tha, as shown in Equations 13 and 14.

$$|P_{k+1} - P_k| \geq THa \qquad \text{Equation 13}$$

$$|P_k - P_{k-1}| \geq THa \qquad \text{Equation 14}$$

The defective pixel sensor 201 transmits to the distance detection circuit 6A defective pixel information 202, including coordinates (k) of the defective pixel, and sends an alarm signal 203 to warn the operator.

The distance detection circuit 6A calculates an evaluation function for the corresponding pixels in the right and left measuring windows after the defective pixels have been removed based on the defective pixel information 202.

This invention will emit a warning signal under the following conditions: a low-contrast condition occurs for outputs from the CCD elements in a plurality of the windows set in the optical sensor arrays; an abnormal condition of an evaluation function determined for the plurality of the measuring windows continues for a specified duration or longer; a defective pixel is detected. Upon emitting the warning signal, an operator can take necessary measures to correct a defective pixel or malfunction.

In addition, if the number of the measuring windows having the low-contrast conditions exceeds a specified value, and such measuring windows are present in both windows, the alarm signal indicates a malfunction caused by condensation. If the number of the measuring windows experiencing the low-contrast conditions is lower than the total of all measuring windows in the optical sensor arrays, and the number of the measuring windows experiencing the low-contrast conditions is present in only one light-sensitive device; or the evaluation function that is determined for a plurality of the windows (number of which is lower than the number of all the measuring windows in the optical sensor arrays) is abnormal, the alarm signal indicates a malfunction caused by a foreign particle, and alerts the operator to take corrective action.

In addition, when using the image data from the optical sensor arrays in the lateral pair of the light-sensitive devices to calculate an evaluation function for each pair of the measuring windows and to detect the distance to the object, i.e. the preceding car 16, the apparatus marks and removes the defective pixels from the calculations before determining the distance from the object, by determining the absolute value of the difference between the image data from the adjacent pixels in the optical sensor arrays and eliminating the absolute value exceeding a specified threshold. It then outputs an alarm signal alerting the operator to take a corrective action, e.g. cleaning the lens.

What is claimed is:

1. A distance-measuring apparatus, comprising:

a pair of optical systems having optical axes parallel to each other;

a pair of light-sensitive devices having optical sensor arrays disposed on image-forming surfaces of the optical axes of the respective optical systems, said optical sensor arrays being disposed parallel to each other at a specified interval and having a plurality of measuring windows with optical sensor elements, said light-sensitive devices being disposed in an axial direction to allow the apparatus by using image data from the optical sensor arrays to detect a distance to an object located in front of the apparatus, and a poor visibility detection system connected to the light-sensitive devices, said poor visibility detection system detecting one of conditions selected from a group consisting of a first condition such that the optical sensor elements in the optical sensor arrays have low-contrast conditions for a specified duration, and a second condition such that an abnormal condition of an evaluation function directed to the plurality of the measuring windows continues for a specified duration, and emitting an alarm upon detection of one of the first and second conditions.

2. A distance-measuring apparatus according to claim 1, wherein when a number of the measuring windows indicating the low-contrast conditions exceeds a predetermined value, and when the measuring windows with the low-contrast conditions are present in both light-sensitive devices, said poor visibility detection system sets the alarm to indicate a malfunction caused by condensation in the optical system.

3. A distance-measuring apparatus according to claim 1, wherein when a number of the measuring windows indicating the low-contrast conditions is lower than that of all of the measuring windows in the optical sensor arrays, and when the measuring windows with the low-contrast conditions are present in only one of the light-sensitive devices, said poor visibility detector emits an alarm signal indicating a malfunction caused by a foreign particle in the optical system.

4. A distance-measuring apparatus according to claim 1, wherein when an evaluation function determined for a plurality of the measuring windows, which are less than a total of the measuring windows, in the optical sensor arrays is in an abnormal condition, said poor visibility detector emits an alarm signal indicating a malfunction caused by a foreign particle in the optical system.

5. A distance-measuring apparatus, comprising:

a pair of optical systems having optical axes parallel to each other;

a pair of light-sensitive devices made of optical sensor arrays disposed on image-forming surfaces of the optical axes of the respective optical systems, said optical sensor arrays being disposed parallel to each other at a specified interval and having a plurality of measuring windows with optical sensor elements, said light-sensitive devices being disposed in an axial direction;

calculation means connected to the light-sensitive devices for calculating an evaluation function for each pair of the measuring windows in each pair of the optical sensor arrays by using image data from the optical sensor arrays in the pair of the light-sensitive devices to detect a distance from an object located in front of the apparatus; and a defective pixel sensor connected to the light-sensitive devices for detecting from image data of the optical sensor elements if an absolute value of a difference between one of the optical sensor elements and an optical sensor element adjacent thereto exceeds a specified threshold, said defective pixel sensor isolating a pixel as defective prior to distance detection and outputting a defective pixel position information.

6. A distance-measuring apparatus according to claim 5, further comprising means for removing the defective pixel from calculation of the evaluation function in a distance detection based on said defective pixel position information.

7. A distance-measuring apparatus according to claim 5, wherein said defective pixel sensor detects the defective pixel at a time at least when the apparatus is turned on and when the apparatus is in an on-condition.

8. A distance-measuring apparatus according to claim 5, wherein said defective pixel sensor emits an alarm signal indicating a presence of the defective pixel together with the defective pixel position information.

9. A distance-measuring apparatus according to claim 5, wherein said object located in front of the apparatus and for which distance from the apparatus is to be calculated is a vehicle.

* * * * *

UNITED STATES PATENT AND TRADEMARK OFFICE
CERTIFICATE OF CORRECTION

Figure 14A:
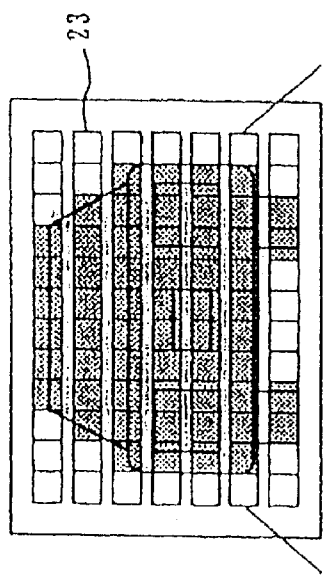
FIGS. 14(A) and 14(B) show sizes of preceding cars within the measuring visual field of FIG. 6.
Figure 14B:
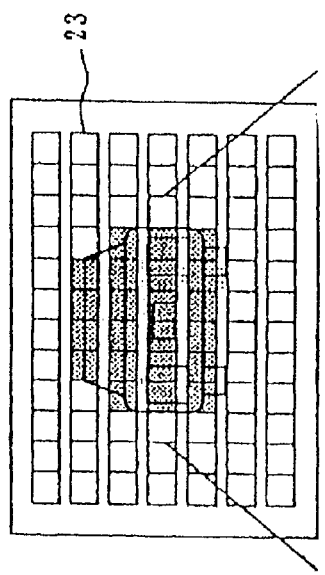
Figure 13:
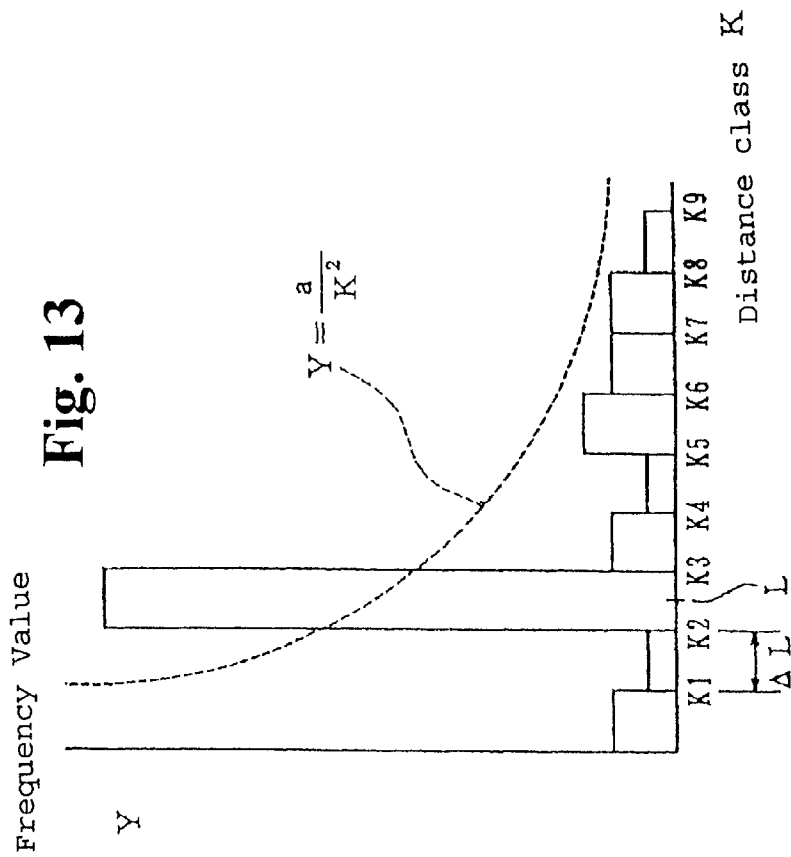
FIG. 13 shows a principle for the operation of a distance selection section of FIG. 6.
Figure 16:
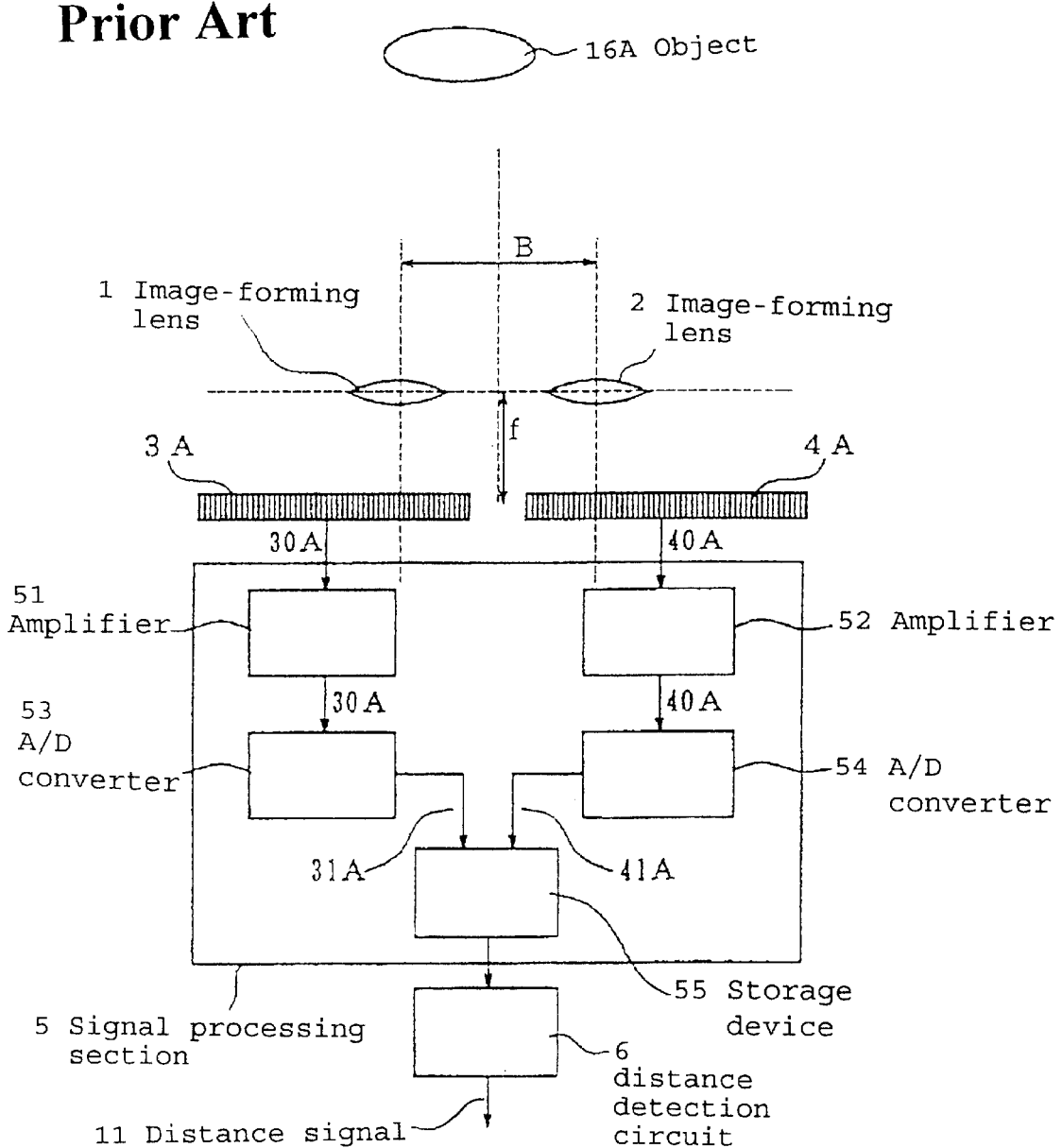
FIG. 16 is a block diagram of an inter-vehicle distance-measuring apparatus based on a technique prior to the previous application.
Figure 19:
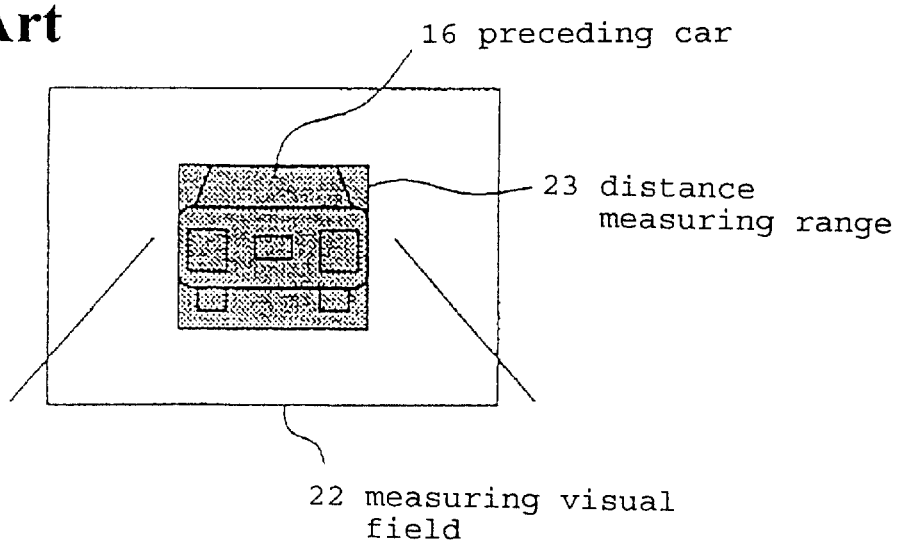
FIG. 19 shows an image obtained during an inter-vehicle distance detection of FIG. 16 under normal conditions.
Figure 20:
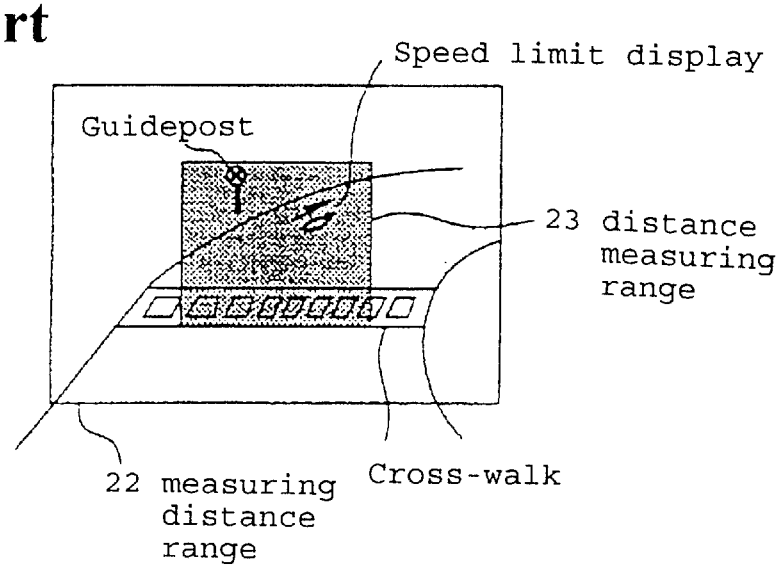
FIG. 20 shows a difficulty for an inter-vehicle distance detection in FIG. 16.

PATENT NO.   : 5,920,382
DATED        : July 6, 1999
INVENTOR(S)  : Hideo Shimizu, Takehide Hirabayashi and Akio Izumi It is certified that error appears in the above-identified patent and that said Letters Patent is hereby corrected as shown below:

Column 1,
Line 43, change "midpoints" to -- midpoint --;
Line 44, after "defined" add -- as --;

Column 2,
Line 44, change "a view" to -- the distance measuring range --;

Column 3,
Line 19, change "30ι" to -- 301 --;
Line 20, change "3ι" to -- 31 --;
Line 22, change "40ι" and "4ι" to -- 401 -- and -- 41 --; respectively;
Line 25, change "51ι", "52ι" and "53ι" to -- 511 --, -- 521 -- and -- 531 --, respectively;
Line 26, change "54ι" to -- 541 --;
Line 41, change "411,," to -- 411 --;

Column 4,
Line 57, change "FIG. 14" to -- FIGS. 14 (A) and 14 (B) --;

Column 5,
Line 25, change "FIG. 15" to -- FIGS. 15 (A) - 15 (D) --;

Column 6,
Line 44, after "apparatus" add -- body --;

UNITED STATES PATENT AND TRADEMARK OFFICE
CERTIFICATE OF CORRECTION

PATENT NO. : 5,920,382
DATED : July 6, 1999
INVENTOR(S) : Hideo Shimizu, Takehide Hirabayashi and Akio Izumi It is certified that error appears in the above-identified patent and that said Letters Patent is hereby corrected as shown below:

Column 7,
Line 6, change "lane" to -- line --;

Column 12,
Line 15, change "an" to -- a --;
Line 24, change "$|PR_{1+1}-PR_i|$" to -- $|PR_{i+1}-PR_i|$ --;
Line 39, change "Tha" to -- Tha --; and Column 14,
Line 10, change "detector" to -- detection system --.

Signed and Sealed this

Twenty-third Day of April, 2002

Attest:

JAMES E. ROGAN
Attesting Officer    Director of the United States Patent and Trademark Office